United States Patent [19]

Huybrechts et al.

[11] Patent Number: 5,936,026
[45] Date of Patent: Aug. 10, 1999

[54] COATINGS COMPRISING SELF-STABILIZED LATTICES PREPARED IN A AQUEOUS CARRIER

[75] Inventors: Jozef Huybrechts, Oud-Turnhout, Belgium; Michael Fryd, Moorestown, N.J.; Paul Bruylants, Boortmeerbeek, Belgium; Kerstin Stranimaier, Bonn, Germany

[73] Assignee: E. I. du Pont de Nemours and Company, Wilmington, Del.

[21] Appl. No.: 08/737,574

[22] PCT Filed: May 9, 1995

[86] PCT No.: PCT/US95/05767

§ 371 Date: Nov. 14, 1996

§ 102(e) Date: Nov. 14, 1996

[87] PCT Pub. No.: WO95/32229

PCT Pub. Date: Nov. 30, 1995

Related U.S. Application Data

[63] Continuation of application No. 08/246,195, May 19, 1994, abandoned.

[51] Int. Cl.$^6$ ............... C08L 51/00
[52] U.S. Cl. ............... 524/504
[58] Field of Search ............... 524/504

[56] References Cited

U.S. PATENT DOCUMENTS 5,231,131  7/1993  Chu et al. ............... 524/504

FOREIGN PATENT DOCUMENTS 0455028  4/1991  European Pat. Off. .

*Primary Examiner*—Edward J. Cain
*Attorney, Agent, or Firm*—James A. Costello; Sudhir G. Deshmukh

[57] ABSTRACT

An aqueous coating composition comprising a graft copolymer characterized by carboxylic-acid or amine functional macromonomers attached at a terminal end thereof to a polymeric backbone, wherein the macromonomers are grafted in an aqueous carrier in which the carboxylic-acid or amine functional groups have been neutralized. Such compositions provide improved properties for an automotive finish.

12 Claims, No Drawings

COATINGS COMPRISING SELF-STABILIZED LATTICES PREPARED IN A AQUEOUS CARRIER

CROSS-REFERENCE TO RELATED APPLICATION

This is a 371 application of PCT/US95/05767, filed on May 9, 1995 which is a continuation of U.S. Ser. No. 08/246,195 filed on May 19, 1994, now abandoned.

TECHNICAL FIELD

This invention relates to an improved aqueous composition for coating a variety of substrates. In particular, this invention is directed to a coating composition comprising a graft copolymer, referred to as a self-stabilized latex, having neutralized carboxylic-acid or amine functionality in a graft segment thereof which stabilizes the aqueous graft copolymer dispersion. The invention involves preparing the graft copolymer in an aqueous carrier.

BACKGROUND OF THE INVENTION

Automobiles and trucks receive exterior finishes for several well known reasons. First, such finishes provide barrier protection against corrosion. Second, consumers prefer an exterior finish having an attractive aesthetic finish, including high gloss and excellent DOI (distinctness of image).

A typical automobile steel panel or substrate has several layers of finishes or coatings. The substrate is typically first coated with an inorganic rust-proofing zinc or iron phosphate layer over which is provided a primer which can be an electrocoated primer or a repair primer. Optionally, a primer surfacer can be applied to provide for better appearance and/or improved adhesion. A pigmented basecoat or colorcoat is next applied over the primer. A typical basecoat or colorcoat comprises a pigment, which may include metallic flakes in the case of a metallic finish. In order to protect and preserve the aesthetic qualities of the finish on the vehicle, it is well known to provide a clear (unpigmented) topcoat over the colored (pigmented) basecoat, so that the basecoat remains unaffected even on prolonged exposure to the environment or weathering.

Coating compositions comprise one or more film-forming polymers. Most commonly, acrylic polymers are linear in structure and cure, upon application, by reaction with crosslinking agents. However, the use of non-linear graft copolymers has been disclosed. For example, U.S. Pat. No. 4,801,653 to Das et al. describes the use of hydroxy functional graft copolymers. Das et al. disclose grafting by a condensation reaction between epoxy groups of a glycidyl ester, contained in an acrylic polymer, and carboxy groups on at least a portion of vinyl monomers which are polymerized in the presence of the acrylic polymer.

In preparing graft polymers in general, various living polymerization methods have been disclosed for obtaining functional ended polymers by selective termination of living ends. Such functionally ended polymers may subsequently be attached to another polymer, that is, as so-called macromonomer "arms" on a polymeric backbone to form a comb or graft copolymer. Webster, in "Living Polymerization Methods,"251 SCIENCE 887 (Feb. 22, 1991) generally discloses living polymerization methods for preparing architectural forms of polymers, including graft and comb copolymers.

U.S. Pat. No. 4,680,352 to Janowicz et al., U.S. Pat. No. 4,722,984 to Janowicz, and PCT WO 87/03605 disclose the use of cobalt (Co) chelates as chain transfer agents in free radical polymerization. The latter patents disclose that macromonomers prepared by cobalt chain transfer can be polymerized to produce graft copolymers which are useful in coating and molding resins, including high solid finishes and aqueous or solvent based finishes. The use of such polymers, however, have so far found only limited use in the automotive finishes area, as for example disclosed in U.S. Pat. No. 5,010,140.

The present invention relates to aqueous coating compositions. The evolution of environmental regulations has led to the need for products with lower volatile organic content (VOC). However, it is far from trivial to develop aqueous products with desirable properties for automotive finishes. As mentioned above, such finishes must be high performance in terms of aesthetic qualities and durability.

Water dispersible polymers are well known in the art and have been used to form waterbased coating compositions, pigment dispersions, adhesives and the like. Graft copolymers containing carboxyl groups and the preparation of these polymers is shown in Japanese Laid Open Patent Application (Kokai) No. 1-182304 dated Jul. 20, 1989. This reference shows graft copolymers that have carboxyl groups and discloses side chains from acrylic and methacrylic acid that have hydrophilic properties. This reference further teaches the use tertiary alcohol-based ester units of acrylic or methacrylic acid to form a macromonomer which is used to form a graft copolymer and then is hydrolyzed to form carboxylic-acid groups on the polymer. The process taught by the reference is an inefficient process which does not form pure graft copolymer but results in a mixture of graft copolymer and low molecular weight components that are detrimental to pigment dispersions formed from the graft copolymer and finishes formed from such a composition.

BASF EP 0363723 describes an acid-functional acrylic copolymer dispersion for use in an original equipment manufacturer (OEM) clear coat to be crosslinked with a melamine formaldehyde binder. The acrylic copolymer is prepared in a solvent in a two-stage process where the hydrophilic part (acid-functional monomer) is concentrated in one of the two stages. The overall copolymer is afterwards neutralized with an amine and dispersed in water. The difference between a one stage product is the solids/viscosity relation being most favorable for the two stage acrylic. A disadvantage of this technology is the fact that the hydrophilic part needs to be over 60% of acid functional monomer which could give problems in humidity resistance. The present method has the advantage that acid or amine functional copolymer macromonomers could be used which provide advantages in terms of humidity resistance, appearance, and lower minimum film-forming temperatures. Also, little to no cosolvent is needed to prepare the graft copolymer dispersion. Another disadvantage is that introducing hydroxy functional monomers in the hydrophilic part has strong negative effects on the solids/viscosity balance. Finally, another disadvantage is that the two stage acrylic needs to be prepared in cosolvents.

Bayer patents EP 0218906 and EP 0324334 describe the synthesis of hydroxy-acid functional acrylic copolymers prepared in solution before neutralizing with an amine and dispersing in water. This has the disadvantage of the solids/viscosity balance referred to above.

Bayer EP 0334032 describes the synthesis of an acid-functional urethane oligomer which is used to stabilize a waterborne acrylic copolymer dispersion. This technology does not allow hydroxy-functional groups (for crosslinking) in the hydrophilic stabilizing part.

AKZO U.S. Pat. No. 5,098,947 describes urethane modified acrylic copolymer dispersions for waterborne coatings. This technology is also limited by the use of cosolvents in which the urethane part is prepared.

As indicated above, the aqueous finishes disclosed in the prior art have significant disadvantages, for example, in terms of humidity resistance, acid resistance, durability, appearance and other properties. Thus, the problem of developing aqueous finishes with improved properties remains and has been the subject of considerable research and development in the automotive coatings industry.

The present invention offers significant advantages. Acid or amine functional macromonomers can be used which provide improved humidity resistance and appearance. Lower minimum film-forming temperatures may be used. Little to no cosolvent is needed to prepare the graft copolymer dispersion. The acid-functional or amine-functional graft can also be hydroxy functional for crosslinking with the amino formaldehyde and/or the (un)blocked polyisocyanate crosslinkers.

SUMMARY OF THE INVENTION

The present invention relates to a waterborne curable composition comprising a blend of a graft copolymer, which contains active functional or reactive groups, and a curing agent. The graft copolymer is prepared from an acrylic copolymer macromonomer comprising at least 10% by weight of polymerizable alpha-beta ethylenically unsaturated monomers with carboxylic or amine functionalities and a weight average molecular weight (MW) of 500 to 30,000. About 2–98% (by weight) of the macromonomer is copolymerized with 98–2% of a blend of other alpha, beta-ethylenically unsaturated monomers to form a graft copolymer with a MW of at least 3000. The macromonomer is neutralized with an amine or acid or other neutralizing agent before dispersing in the aqueous carrier and then forming the graft copolymer by copolymerizing the backbone monomers in the presence of an aqueous dispersion of the macromonomers.

Suitably, the curing agent comprises a melamine formaldehyde or alkylated melamine formaldehyde compound or a blocked or unblocked isocyanate compound in a one-package system or an isocyanate compound, preferably a water-dispersible polyisocyanate, in a two-package system, or other crosslinking agents such as epoxies, silanes, carbodiimides, etc. able to react with the functional groups present on the graft copolymer.

It has been found that improved aqueous or waterborne coating systems are obtained by using these graft copolymers. Such compositions have the advantage of providing excellent coating properties desirable for an automotive finish. The present invention is directed to a coating composition comprising:

(a) from about 5 to 98 percent, based on the weight of the binder, of a graft copolymer having a weight average molecular weight of 3,000 to 500,000 comprising:
  (i) 2 to 98 percent by weight of the graft polymer of a polymeric backbone comprising ethylenically unsaturated monomers, and
  (ii) 98 to 2 percent, by weight of the graft polymer, of macromonomers attached to said polymeric backbone at a single terminal point of each macromonomer, said macromonomers comprising from about 10 to 100 percent, based on the weight of the macromonomer, of polymerized ethylenically unsaturated monomers all containing carboxylic functionality, or instead amine functionality, and having a weight average molecular weight of about 500–30,000, such that the macromonomers are water soluble or dispersible when neutralized, the macromonomer comprising methacrylate monomeric units having been reacted in the presence of a cobalt chelate chain transfer agent;

(b) 2 to 50 percent, based on the weight of the binder of a crosslinking agent which reacts and crosslinks with said carboxylic or amine functionality in said graft polymer; and (c) 40 to 90 percent by weight, based on the weight of the composition, of an aqueous carrier comprising 80 to 100 percent water; wherein said graft copolymer is the polymerization product, in an aqueous carrier comprising 80 to 100 percent water, of said macromonomers and said monomers comprising said backbone, and wherein said carboxylic or amine functionality has been at least partially neutralized to form a stable dispersion or solution, with the backbone mostly in particle form, in aqueous carrier.

This above-described graft copolymer may also be employed together with a curable linear or branched film-forming polymers or binder materials, in various proportions. For example, the composition may comprise linear or branched hydroxy-functional acrylic, polyester, or polyurethane copolymers. Further binder materials, in relatively minor amounts, include, for example thickeners, adhesion promoters, etc.

The present composition is especially useful for finishing the exterior of automobiles and trucks and parts thereof. The present composition, depending on the presence of pigments and other conventional components, may be used as a primer, primer surfacer, basecoat, and/or clearcoat. It is especially advantageous for use in an aqueous clearcoat. The invention also includes a process for coating a substrate with the above coating composition. The claimed composition further includes a substrate having adhered thereto a coating according to the above composition. The graft copolymer and the process for making the graft copolymer are also part of this invention.

The present invention offers several significant advantages. First, graft copolymers with acid or amine groups concentrated in one segment require less acid or amine to get a stable dispersion, thus leaving fewer moisture sensitive carboxylic or amine groups in the final coating.

Second, standard emulsions are stabilized by surfactants which besides remaining in the film as moisture sensitive residues, migrate to the coating interfaces and generate weak boundary layers which lead to poor adhesion and delamination. The surfactants also stabilize foam formed by trapped air during spraying, leading to pinholing. The compositions according to the present invention can be made with lesser amounts of surfactants, preferably no surfactants.

Third, standard emulsions for which water is a nonsolvent, need considerable solvent to allow coalescence (film formation) after being applied to a surface. This leads to higher VOC. In the present invention, the hydrophilic macromonomers which are on the surface of the self-stabilized lattices are plasticized by the water and allow film formation with little or no solvent, thus allowing coating compositions to be formulated with much lower VOC. These and other advantages of the invention can be better understood by reference to the following detailed description of the invention.

DETAILED DESCRIPTION OF THE INVENTION

The waterborne coatings of the present invention comprise an acrylic-based binder system in an aqueous base.

This binder system comprises, in its overall concept, a water soluble or dispersible acrylic graft copolymer which is formed by free radical initiated copolymerization of 2–98% (by weight) alpha-beta unsaturated monomers in the presence of an acrylic macromonomer. The acrylic macromonomer has an average number molecular weight (N) of between 500 to 30,000 and containing at least 10% of an acid or amine functional alpha-beta unsaturated monomer. By the term "acid or amine" is meant alternatively one or the other, not both aggregately, since cationic or anionic, not amphoteric systems are contemplated. After at least partial neutralization of the carboxyl groups or amine with, for example, an amine in the case of carboxy groups, these acrylic resins form stable solutions or dispersions in water. These resins form particles, either alone or in aggregate with other such resins in the composition, in which the macromonomers are relatively hydrophilic and hence soluble or dispersible in the aqueous carrier, and the polymeric backbone (to which the macromonomers are attached) is relatively water insoluble. Such particles may be crosslinked or uncrosslinked, for example by means of diacrylate monomeric units, and suitably have an average particle size of 50 to 1000 nanometers (nm), preferably 100 to 250 nm.

The acrylic macromonomer is preferably prepared using a free radical initiator in a solvent with a Co (II) or Co (III) chelate chain transfer agent and contains 10 to 100 percent, preferably 20 to 40 percent, by weight of an functional monomer, e.g., acrylic acid, methacrylic acid, maleic acid, and itaconic acid or their anhydrides (which can be hydrolyzed to the acid after polymerization). Amine-functional monomers include t-butylamino ethyl methacrylate, diethyl (or dimethyl) amino ethyl acrylate, diethyl amino ethyl methacrylate, and the like. Preferably the macromonomer is based on methacrylic acid or dimethyl amino ethyl methacrylate.

In general, the total polymeric and oligomeric components of a coating composition are conventionally referred to as the "binder" or "binder solids" and are dissolved, emulsified or otherwise dispersed in the aqueous liquid carrier. The binder solids generally include all the normally solid polymeric components of the composition. Generally, catalysts, pigments, or chemical additives such as stabilizers are not considered part of the binder solids. Non-binder solids other than pigments usually do not amount for more than about 10% by weight of the composition. The coating composition of the present invention suitably contains about 10–90%, more typically 50–70% by weight of the binder, and about 40–90%, more typically 50–70% by weight, of an aqueous carrier.

The present composition suitably comprises about 5 to 98 percent, preferably 20 to 90%, suitably 40 to 80%, based on the weight of the binder, of the specified graft polymer.

The graft copolymer contains about 2–98%, preferably 5–40%, and most preferably 15–40% by weight of macromonomer and correspondingly about 98–2%, preferably 60–95%, most preferably 60–85% by weight of backbone polymer. The graft copolymer has a weight average molecular weight of about at least 3,000, preferably 20,000 to 500,000, most preferably 20,000 to 300,000. The side chains of the graft copolymer are formed from relatively water soluble macromonomers that have a weight average molecular weight of about 500–30,000 and preferably 3,000–10,000 and contain about 10–100% by weight and preferably 20–40% by weight, based on the weight of the macromonomer, of polymerized ethylenically unsaturated acid or amine monomers which are then at least partially neutralized. These side chains are relatively hydrophilic and keep the graft polymer well dispersed in the resulting coating composition.

The backbone of the graft copolymer is hydrophobic relative to the side chains and contain polymerized ethylenically unsaturated acid or amine monomers or salts thereof. The backbone may contain polymerized monomers which are preferably acrylates or styrene, but which can contain 50% of methacrylates. Such monomers may comprise alkyl methacrylates and acrylates, cycloaliphatic methacrylates and acrylates and aryl methacrylates and acrylates as are listed hereinafter. It may contain up to 50% by weight, based on the weight of the graft copolymer, of polymerized ethylenically unsaturated non-hydrophobic monomers which may contain reactive functional groups other than acid or amine. Examples of such monomers are hydroxy ethyl acrylate, hydroxy ethyl methacrylate, acrylamide, nitro phenol acrylate, nitro phenol methacrylate, phthalimido methyl acrylate, and phthalimido methacrylate. Other vinyl monomers can be incorporated into the backbone, e.g., ethylenically unsaturated sulfonic, sulfinic, phosphoric or phosphonic acid and esters thereof also can be used such as styrene sulfonic acid, acrylamido methyl propane sulfonic acid, vinyl phosphonic acid and its esters and the like.

In one embodiment, the waterborne acrylic graft copolymers contain 0–60 or more preferably 10–40 parts by weight of hydroxy functional acrylic monomers, e.g., 2-hydroxyethyl acrylate, 2-hydroxyethyl methacrylate, 2-hydroxypropyl acrylate, 2-hydroxypropyl methacrylate, 2-hydroxbutyl acrylate, and 4-hydroxybutyl acrylate. All or most of these may be present in the side chains and may serve as crosslinking sites.

As indicated earlier, the graft polymer comprises macromonomeric side chains attached to a polymeric backbone. Each macromonomer ideally contains a single terminal ethylenically unsaturated group which is polymerized into the backbone of the graft copolymer and typically contains polymerized monomers of methacrylic acid, its esters (including acid and amino esters), nitriles, amides or mixtures of these monomers.

The above-mentioned acids or amines also can be used in the backbone of the graft copolymer, but usually in a lesser amount by weight than in the macromonomeric arms, in order to maintain the water-insolubility of the backbone. In such a case, however, the selection of acid or amine in the backbone should be consistent with the use of either acid or amine in the macromonomers.

In addition to the acid or amine, up to 90% by weight, based on the weight of the macromonomer, of other polymerized ethylenically unsaturated monomers can be present in the macromonomer, for example, but not limited to acrylic and methacrylic acid esters of straight-chain or branched monoalcohols of 1 to 20 carbon atoms. The majority of these, greater than 50%, preferably 60–80% of the macromonomer, should be methacrylates, for example, alkyl methacrylates having 1–12 carbons in the alkyl group can be used such as methyl methacrylate, ethyl methacrylate, propyl methacrylate, isopropyl methacrylate, butyl methacrylate, pentyl methacrylate, hexyl methacrylate, 2-ethyl methacrylate, nonyl methacrylate, lauryl methacrylate and the like can be used. Cycloaliphatic methacrylates can be used such as trimethylcyclohexyl methacrylate, t-butyl cyclohexyl methacrylate, isobornyl methacrylate, 2-ethylhexyl methacrylate, and the like. Aryl methacrylates such as benzyl methacrylate also can be used.

Ethylenically unsaturated monomers containing hydroxy functionality include hydroxy alkyl acrylates and hydroxy alkyl methacrylates, wherein the alkyl has 1 to 12 carbon atoms. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof. Reactive functionality may also be obtained from monomer precursors, for example, the epoxy group of a glycidyl methacrylate unit in a polymer. Such an epoxy group may be converted, in a post polymerization reaction with water or a small amount of acid, to a hydroxy group, or with ammonia and/or a primary amine to give a hydroxy amine.

Suitable other olefinically unsaturated comonomers include: acrylamide and methacrylamide and derivatives as alkoxy methyl (meth) acrylamide monomers, such as methacrylamide, N-isobutoxymethyl methacrylamide, and N-methylol methacrylamide; maleic, itaconic and maleic anhydride and its half and diesters; vinyl aromatics such as styrene and vinyltoluene; polyethylene glycol monoacrylates and monomethacrylates; aminofunctional (meth) acrylates as, e.g., diethylaminoethylmethacrylate and t-butylaminoethylmethacrylate; glycidyl functional (meth) acrylates as glycidylmethacrylate.

Other functional monomers as acrylonitrile, acrolein, allyl methacrylate, aceto acetoxyethyl methacrylate, methylacryl amidoglycolate methylether, ethylene ureaethyl methacrylate, 2-acrylamide-2 methyl propanesulfonic acid, trialkoxy silyl propyl methcrylate, reaction products of mono epoxyesters or monoepoxy ethers with alpha-beta unsaturated acids and reaction products of glycidyl (meth) acrylate with mono functional acids up to 22 carbon atoms.

The above monomers also can be used in the backbone of the graft copolymer.

The graft polymer may be prepared by polymerizing ethylenically unsaturated monomers in the presence of macromonomers each having a terminal ethylenic unsaturation for grafting. The resulting graft polymer can be envisioned as being composed of a backbone having a plurality of macromonomer "arms" attached thereto. In the present composition, both the macromonomer arms and the backbone may have reactive functionalities capable of reacting with a crosslinking compound or polymer, although it is optional to have such reactive functionalities only on the macromonomers. It is to be understood that the macromonomers referred to as having carboxylic functionality may be part of a mixture of macromonomers of which a portion do not have any carboxylic functionality or variable amounts of carboxylic functionality.

To ensure that the resulting macromonomer only has one terminal ethylenically unsaturated group which will polymerize with the backbone monomers to form the graft copolymer, the macromonomer is polymerized by using a catalytic chain transfer agent. Typically, in the first step of the process for preparing the macromonomer, the monomers are blended with an inert organic solvent which is water miscible or water dispersible and a cobalt chain transfer agent and heated usually to the reflux temperature of the reaction mixture. In subsequent steps additional monomers and cobalt catalyst and conventional polymerization catalyst are added and polymerization is continued until a macromonomer is formed of the desired molecular weight.

Preferred cobalt chain transfer agents or catalysts are described in U.S. Pat. No. 4,680,352 to Janowicz et al, U.S. Pat. No. 4,722,984 to Janowicz and WO 87/03605. Most preferred are pentacyanocobaltate (II or III), diaquabis (borondifluorodimethyl-glyoximato) cobaltate (II or III) and diaquabis(borondifluorophenylglyoximato) cobaltate (II or III), ethylenically unsaturated sulfonic, sulfinic, phosphoric or phosphonic acid and esters thereof also can be used such as styrene sulfonic acid, acrylamido methyl propane sulfonic acid, vinyl phosphonic acid and its esters and the like. Typically these chain transfer agents are used at concentrations of about 5–1000 ppm based on the monomers used.

The macromonomer is preferably formed in a solvent or solvent blend using a free radical initiator and a Co (II or III) chelate chain transfer agent, although it can be formed in aqueous solution or emulsion when using, for example, diaquabis(borondifluorodimethyl-glyoximato) cobaltate (II or III).

Azoinitiators (0.5–5% weight on monomer) can be used in the synthesis of the macromonomers in the presence of 2–5,000 ppm (on total monomer) or Co (II) chelate in the temperature range between 70–180° C., more preferably azo type initiators as, e.g., 2,2'-azobis (2,4 dimethylpentanenitrile), 2,2'-azobis (2-methylpropanenitrile), 2,2'-azobis (2-methylbutanenitrile), 1,1'-azo (cyclohexane carbonitrile) and 4,4'-azobis (4-cyanopentanoic) acid.

Typical solvents that can be used to form the macromonomer copolymer are aromatics, aliphatics, ketones such as methyl ethyl ketone, isobutyl ketone, ethyl amyl ketone, acetone, alcohols such as methanol, ethanol n-butanol isopropanol esters such as ethyl acetate, glycols such as ethylene glycol propylene glycol ethers such as tetrahydrofuran, ethylene glycol mono butyl ether and the like, and as mentioned above, water and mixtures thereof with water miscible solvents.

After the macromonomer is formed as described above, solvent is optionally stripped off, the macromonomer neutralized, and the backbone monomers added to the macromonomer along with polymerization catalyst. As neutralizing agents for acids can be used inorganic bases include ammonium hydroxide, sodium hydroxide, or potassium hydroxide. Typical amines that can be used as neutralizing agents include amino methyl propanol, amino ethyl propanol, dimethyl ethanol amine, triethylamine, dimethylethanolamine, dimethylaminomethylpropanol and aminomethylpropanol and the like. One preferred amine is amino methyl propanol and the preferred inorganic base is ammonium hydroxide.

As neutalizing agents for amines, organic or inorganic acids can be used, for example, acetic acid, formic acid, lactic acid, hydrochloric acid, sulfuric acid, and the like.

As indicated above, the graft copolymer is formed directly into water, wherein the macromonomer is first neutralized and dispersed or dissolved into water. The graft copolymer is formed by copolymerizing the rest of the monomer blend in the presence of the macromonomer water solution or dispersion. This procedure has the advantage that less cosolvent should be used in the overall process and solvent stripping can be eliminated. Another advantage is that higher molecular weight graft polymers can be obtained than in solvent polymerization.

Mixtures of suitably compatible macromonomers can be used as long as all are either anionic or cationic in water.

Any of the aforementioned azo type catalysts can be used as can other suitable catalysts such as peroxides and hydroperoxides. Typical of such catalysts are di-tertiarybutyl peroxide, di-cumylperoxide, tertiaryamyl peroxide, cumenehydroperoxide, di(n-propyl) peroxydicarbonate, peresters such as amyl peroxyacetate and the like. Polymerization is continued usually at the reflux temperature of the reaction mixture until a graft copolymer is formed of the desired molecular weight.

Water-soluble free radical initiators can be used, suitably in the temperature range of 20–98° C., e.g., peroxides such as ammonium persulfate, or redoxinitiators such as t-butylhydroperoxide/ascorbic acid. On copolymerizing the monomers with the macromonomer optionally chain transfer agents other than the cobalt chelates can be used as, e.g., mercaptans: mercaptoethanol, t-dodecylmercaptan, N-dodecylmercaptan.

In the synthesis of the graft copolymer small amounts of difunctional alpha-beta unsaturated compounds can be used as, e.g., ethyleneglycol dimethacrylate or hexanedioldiacrylate. This can result in crosslinked particles.

The overall graft copolymer water borne dispersion should be characterized by an acid or amine value of from 10 to about 150 (mg KOH/g resin solids), more preferably from 15 to about 70 and still more preferably from 15 to about 35, and an hydroxyl number of about 0 to about 250 (mg KOH/g resin solids), more preferably from 40 to 150.

The degree of neutralization of the dispersion can be from 10 to 150% of the total amount of acid or amine groups, preferably from 80–105%. The final pH of the dispersion can accordingly be about 4–10, preferably 7–10 for an anionic system and 4–7 for a cationic system. Anionic, cationic or non-ionic surfactants can be used, but preferably not since they might hurt humidity resistance afterwards. As indicated above, not having to use a surfactant is one of the significant advantages of the present invention.

The afore-described binder systems are utilized to produce waterborne coatings by blending with other suitable components in accordance with normal paint formulation techniques.

The graft copolymers of the present invention are useful as film forming vehicles in the preparation of waterborne coatings compositions such as, for example, clearcoat or basecoat compositions useful in automotive applications. The resultant coating compositions have low volatile organic content, preferably to a maximum of 3.50 pounds/gallon.

In preparing the coating compositions of the present invention, the graft copolymer is combined with a crosslinking agent in the amount of 2 to 50 percent by weight of binder, preferably 10 to 40 percent by weight of binder.

If the binder is used in a formulation that is cured with a curing agent containing N-methylol and/or N-methylol ether groups, the curing agent should be dispersed in the water based graft copolymer dispersion to form a stable overall dispersion. Examples of such curing agents are amino resins obtained by reacting an aldehyde, such as formaldehyde, with a compound containing amino group such as melamine, urea and benzoguanamine and total or partial etherification of the N-methylol group with an alcohol such as, e.g., methanol, n-butanol, isobutanol.

To form a composition which will crosslink under elevated baking temperatures of about 60–180° C. for abut 5–60 minutes, about 10 to 60%, preferably 10 to 25% by weight, based on the weight of the binder, of a water-soluble water dispersible alkylated melamine formaldehyde crosslinking agent having 1–4 carbon atoms on the alkylated group is preferred.

These crosslinking agents are generally partially alkylated melamine formaldehyde compounds and may be monomeric or polymeric and if polymeric have a degree of polymerization of about 1–3. Typical alcohols used to alkylate these resins are methanol, ethanol propanol, butanol, isobutanol and the like. preferred alkylated melamine crosslinking agents that are commercially available include Cymel™ 373, 385, 1161, 350, or 1168 (Monsanto) or Resimine™ 714, Resimine™ 730 and 731, Resimine™ 735 and 745 (Cyanamid).

Coating compositions of this invention containing a melamine crosslinking agent can contain about 0.1 to 1.0%, based on the weight of a binder, of a strong acid catalyst or a salt thereof to lower curing temperatures and time. Paratoluene sulfonic acid is a preferred catalyst or its ammonium salt. Other catalysts that can be used are dodecyl benzene sulfonic acid, phosphoric acid and amine or ammonium salts of these acids.

If the binder is used in a formulation that is cured with a polyisocyanate, a water dispersible polyisocyanate is added to the waterborne graft copolymer dispersion prior to application.

The overall dispersion is not stable in this case and should be used within a certain time period. Examples of water dispersible polyisocyanates include biuret and cyclotrimers of hexamethylene diisocyanate, isophorone diisocyanate and tetramethyl xylylene diisocyanate. These isocyanates may be modified to such an extent that they contain ionic groups to ease dispersion into water.

Typically, a cure promoting catalyst is utilized in conjunction with the isocyanate crosslinking or curing agent. Preferred catalysts are organometallics, suitably dibutyl tin dilaurate, dibutyl tin di-2-ethylhexoate, zinc octoate, zinc napthenate, vanadium acetyl acetonate, or zirconium acetyl acetonate, in an effective curing amount, typically from about 0.1 to 2% by weight of binder. Such catalysts are optional, for example, elevated temperature and/or time may suffice to cure the composition.

Typical isocyanate crosslinking agents which may be used for curing the composition include both compounds and polymers, blocked or unblocked. Examples of suitable polyisocyanates include monomeric polyisocyanates such as toluene diisocyanate and 4,4'-methylene-bis (cyclohexylisocyanate), isophorone diisocyanate and NCO-prepolymers such as the reaction products of monomeric polyisocyanate such as those mentioned above with polyester or polyether polyols. Particularly useful isocyanates are isophorone diisocyanate and the biuret-form 1,6-hexamethylene diisocyanate commercially available from Bayer as "Desmodur" N or the like. Other crosslinking agents include 4,4'-biphenylene diisocyanate, tetramethyl diisocyanate, ethylethylene diisocyanate, 1,3-cyclopentylene diisocyanate, 1,3-phenylene diisocyanate, 1,5-naphthalene diisocyanate, bis(4-isocyanatocyclohexyl) methane, and the like.

Trifunctional isocyanates may be used, for example, triphenylmethane triisocyanate, 1,3,5-benzene triisocyanate, 2,4,6-toluene triisocyanate, an adduct of trimethylol and tetramethyl xylene diisocyanate sold under the tradename "Cythane 3160," "Desmodur" N 3390 which is the trimer of hexamethylene diisocyanate, and the like. Optionally, one can use a polyisocyanate acrylic copolymer derived from isocyanatoethyl methacrylate (commercially available as TMI) and the like, as for example disclosed in U.S. Pat. No. 4,965,317 (col. 5).

As indicated above, the polyisocyanate may optionally be blocked. Examples of suitable blocking agents are those materials which would unblock at elevated temperatures, for example, lower aliphatic alcohols such as methanol, oximes such as methylethyl ketone oxime, and lactams such as epsiloncaprolactam. Blocked isocyanates can be used to form stable one-package systems. Polyfunctional isocyanates with free isocyanate groups can be used to form two-package room temperature curable systems. In these systems, the product and isocyanate curing agent are mixed just prior to their application.

Other film-forming polymers, preferably 0 to 55 percent by weight (and concomitantly 45 to 100% by weight of the graft copolymer), based on the weight of the binder, may also be used in conjunction with the graft copolymer. Other film forming polymers may be linear or branched and may include acrylics, acrylourethanes, polyesters, polyester urethanes, polyethers, and polyether urethanes that are compatible with the graft polymer.

An organic cosolvent is also typically utilized in the present composition, preferably in minimal amounts, less than 20% by weight of carrier, to facilitate formulation and application of the coating compositions of the present invention. An organic solvent is utilized which is compatible with the components of the composition.

The amounts of graft copolymer, curing agent, and catalyst will of course, vary widely depending upon many factors, among them the specific components of the composition and the intended use of the composition.

In addition, a composition according to the present invention may contain a variety of other optional ingredients, including pigments, pearlescent flakes, fillers, plasticizers, antioxidants, surfactants and flow control agents.

To improve weatherability of a finish produced by the present coating composition, an ultraviolet light stabilizer or a combination of ultraviolet light stabilizers can be added in the amount of about 0.1–5% by weight, based on the weight of the binder. Such stabilizers include ultraviolet light absorbers, screeners, quenchers, and specific hindered amine light stabilizers. Also, an anitoxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533.

The composition may also include conventional formulation additives such as flow control agents, for example, Resiflow® S (polybutylacrylate), BYK 320 and 325 (high molecular weight polyacrylates); rheology control agents, such as fumed silica, microgels, and non-aqueous dispersion polymers; water scavengers such as tetrasilicate, trimethyl orthoformate, triethyl orthoformate, and the like.

When the present composition is used as a clearcoat (topcoat) over a pigmented colorcoat (basecoat) to provide a colorcoat/clearcoat finish, small amounts of pigment can be added to the clear coat to provide special color or aesthetic effects such as tinting.

The present composition can be pigmented and used as the colorcoat, monocoat, primer, or primer surfacer. The composition has excellent adhesion to a variety of metallic or non-metallic substrates, such as previously painted substrates, cold rolled steel, phosphatized steel, and steel coated with conventional primers by electrodeposition. The present composition can be used to coat plastic substrates such as polyester reinforced fiberglass, reaction injection-molded urethanes and partially crystalline polyamides.

When the present coating composition is used as a basecoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones, metallic flake pigments such as aluminum flake and the like.

The pigments can be introduced into the coating composition by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition. to obtain the present coating compositions.

The coating composition can be applied by conventional techniques such as spraying, electrostatic spraying, dipping, brushing, flowcoating and the like. The preferred techniques are spraying and electrostatic spraying. The present composition may be used as an ambient cure, especially for refinish, or at elevated temperature. In OEM applications, the composition is typically baked at 100–150° C. for about 15–30 minutes to form a coating about 0.1–3.0 mils thick. When the composition is used as a clearcoat, it is applied over the colorcoat which may be dried to a tack-free state and cured or preferably flash dried for a short period before the clearcoat is applied. The colorcoat/clearcoat finish is then baked as mentioned above to provide a dried and cured finish.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following examples illustrate the invention. All parts and percentages are on a weight basis unless otherwise indicated. All molecular weights disclosed herein are determined by gel permeation chromatography using a polystyrene standard.

EXAMPLES 1–2

This example illustrates the use of a Co (II) chelate in the synthesis of the following macromonomers. The chelate is $BF_2$ bridged Co (II) (1,2-diphenyl-1,2-dioxoiminoethane)$_2$ $(H_2O)_2$chelate, as described in example 44B of EP 0199436. Mixture 1 (of Table 1 below) was heated at reflux (±80° C.) in a reaction vessel that was kept under nitrogen. Mixture 2 was added over 4 hours. Simultaneously with the addition of mixture 2, mixture 3 was added over 90 min. followed immediately by mixture 4. Mixture 5 was added, for rinsing, followed by a 5 min. hold. Afterwards, mixture 6 was added over 30 min. followed by another rinsing step and held for 60 min. During the total process, the temperature was kept at reflux. As evident from Table 1, various combinations of monomers were used in Examples 1 to 4.

TABLE 1

|  | Example 1 | Example 2 |
|---|---|---|
| Mixture 1 | | |
| Methyl ethyl ketone | 20 | 20 |
| Mixture 2 | | |
| Methyl methacrylate | 30 | 26 |
| 2-Hydroxyethyl methacrylate | | 14 |

TABLE 1-continued

|  | Example 1 | Example 2 |
|---|---|---|
| Methacrylic acid | 20 | 10 |
| Methyl ethyl ketone | 6 | 6 |
| Mixture 3 | | |
| Methyl ethyl ketone | 4 | 4 |
| Co II chelate | 0.006 | 0.006 |
| Vazo\67 initiator | 0.35 | 0.35 |
| Mixture 4 | | |
| Methyl ethyl ketone | 10 | 10 |
| Co II chelate | 0.003 | 0.003 |
| Vazo\52 initiator | 0.3 | 0.3 |
| Mixture 5 | | |
| Methyl ethyl ketone | 1.23 | 1.23 |
| Mixture 6 | | |
| Vazo[5]2 initiator | 0.1 | 0.1 |
| Methyl ethyl ketone | 1.9 | 1.9 |
| Methyl ethyl ketone (Rinse) | 1 | 1 |
| Final Thinning | | |
| Methyl ethyl ketone | 5.111 | 5.111 |
| TOTAL | 100 | 100 |
| TEST RESULTS | | |
| SOLIDS | 51.8 | 50.2 |
| VISCOSITY (Gardner-Holdt) | Z3 | I - 14 |
| ACID VALUE | 252 | 143 |
| MN | 2306 | 1500 |
| MW | 4800 | 3000 |

EXAMPLE 3

This example again illustrates the use of a Co (II) chelate in the synthesis of the following macromonomers which comprise carboxylic-acid and hydroxy functionality. The chelate is the same as in the above Examples 1–2, as described in EP 0199436. A glass reactor with two inlets, one for the monomer feed and one for the initiator feed was employed. The reaction mixture was kept at reflux temperature throughout the process, while the following components were introduced into the reactor as explained below.

|  | Parts By Weight |
|---|---|
| Part 1 | |
| Isopropyl alcohol | 25 |
| Itaconic acid | 18 |
| Part 2 | |
| Methyl methacrylate | 42 |
| Vazo\67 initiator | 0.3 |
| Methyl ethyl ketone | 6.68 |
| Co II chelate | 0.02 |
| Part 3 | |
| Methyl ethyl ketone | 1 |
| Part 4 | |
| t-Butylperpivalate (Triganox ™ 25 C-75 from AKZO) | 0.1 |
| Isopropyl alcohol | 4.9 |
| Part 5 | |
| Isopropyl alcohol | 2 |
| TOTAL | 100 |

Part 1 was heated to reflux, under nitrogen, until dissolved. Part 2 was then added over 2 hours. Part 3 was used for rinsing. The mixture was then held at reflux for 1 hour. Part 4 was fed over 1 hour. Part 5 was used for rinsing, and then the reaction mixture was held at reflux for one hour. The reaction product was characterized, including AN (acid number), MN (number average molecular weight, and MW (weight average molecular weight), as follows:

| Solids (%) | 60.6 |
|---|---|
| Viscosity | >Z6 |
| AN | 229 |
| MN | 1100 |
| MW = | 3600 |

EXAMPLE 4

This example illustrates the use of a Co (II) chelate in the synthesis of an acid functional macromonomer, which is then dissolved in water. The equatorial ligands of this chelate are $BF_2$ bridged 2,3-dioxyimiomethane groups. as described in EP 0199436. The following components were reacted in a glass reactor as explained below.

|  | Parts by Weight |
|---|---|
| Part 1 | |
| N-Butanol | 20.0 |
| Co II chelate | 0.02 |
| Part 2 | |
| n-Butyl methacrylate | 34.4 |
| Methacrylic acid | 5.6 |
| Vazo ® 67 initiator | 0.2 |
| n-Butylglycolether | 3.3 |
| Part 3 | |
| n-Butylglycolether | 1.0 |
| Part 4 | |
| Vazo ® 67 initiator | 0.2 |
| n-Butylglycolether | 2.8 |
| Part 5 | |
| n-Butylglycolether | 0.5 |
| Part 6 | |
| Dimethylethanolamine | 5.8 |
| Deionized water | 0.2 |
| Part 7 | |
| Deionized water | 126 |
| TOTAL | 200 |

Part 1 was heated, under nitrogen, at reflux. Part 2 was then added over 3 hours. Part 3 was used for rinsing and the mixture was held at reflux for 10 minutes. Part 4 was added over 1 hour and Part 5 was used for rinsing. The mixture was then held at reflux for 10 minutes and cooled to 80° C. Part 6 was then added and mixed for 10 minutes, followed by Part 7 (deionized water) for rinsing. The product exhibited the following characteristics:

| | |
|---|---|
| Solids | 19.4 |
| Viscosity | E |
| pH | 8.6 |
| MN | 3200 |
| MW | 6100. |

Comparative Example 5

This example illustrates the use of a sulfur chain transfer agent in the synthesis of an acid functional polymer. In particular, this example illustrates the preparation of an n-butyl methacrylate/methacrylic acid (96/14) copolymer with a sulfur chain transfer agent.

| | Parts by Weight |
|---|---|
| Part 1 | |
| n-Butanol | 20.0 |
| Part 2 | |
| n-Butyl methacrylate | 34.4 |
| Methacrylic acid | 5.6 |
| Vazo ® 67 initiator | 0.2 |
| n-Butylglycolether | 1.3 |
| N-dodecylmercaptan | 2.0 |
| Part 3 | |
| n-Butylglycolether | 1.0 |
| Part 4 | |
| Vazo ® 67 initiator | 0.2 |
| n-Butylglycolether | 2.6 |
| Part 5 | |
| n-Butylglycolether | 0.5 |
| Part 6 | |
| Dimethylethanolamine | 5.8 |
| Deionized water | 0.3 |
| Part 7 | |
| Deionized water | 126 |
| TOTAL | 200 |

Part 1 (solvent) was heated to reflux. Part 2 (including monomer mixture) was added over 3 hours at reflux, and Part 3 was used for rinsing. The mixture was held at reflux for 10 minutes and then Part 4 (additional initiator) was added over 1 hour. Part 5 was used for rinsing, and the mixture was again held at reflux for 10 minutes, followed by cooling to 80° C. Part 6 (including amine and deionized water) was then added and mixed for 10 minutes, followed by rinsing with the additional deionized water of Part 7. The product exhibited the following characteristics.

| | |
|---|---|
| Solids | 20.7 |
| Viscosity | Q |
| pH | 8.9 |
| MN = | 3400 (peak molecular weight) |
| MW = | 6500 |

EXAMPLE 6

This example illustrates the preparation of a graft acrylic copolymer dispersion. In particular, this example illustrates the preparation of a graft polymer comprising 70% by weight methyl methacrylate/n-butyl acrylate (in the ratio of 20/80) reacted with 30% macromonomer (abbreviated "macro") of n-butyl methacrylate/methacrylic acid (in the weight ratio of 86/14). The following components were reacted as explained below.

| | Parts by Weight |
|---|---|
| Part 1 | |
| Macro of Example 5 | 9 |
| Deionized water | 10 |
| Part 2 | |
| Methyl methacrylate | 4.2 |
| n-Butyl acrylate | 16.8 |
| Vazo ® 67 initiator | 0.1 |
| n-Butylglycolether | 0.9 |
| Macro of Example 5 | 36 |
| Deionized water | 22 |
| Part 3 | |
| n-Butylglycolether | 1 |

Part 1 was heated to 90–95° C. Part 2 was added simultaneously over 4 hours, after which Part 3 was used for rinsing. The mixture was held at reflux for 1 hour. The product was a stable dispersion, with no settling on storage, and exhibited the following properties.

| | |
|---|---|
| Solids | 29.1% |
| MN | 8800 (peak molecular weight) |
| MW | 93800. |

Comparative Example 7

For comparison to Example 6, this example illustrates the preparation of an acylic copolymer, but in which the macromonomer used in Example 4 was replaced with the macromonomer of Example 5 which has approximately the same molecular weight and monomer composition. This acrylic copolymer shows a bimodal distribution which proves that the macromonomer of Example 5 is not copolymerized to provide stabilization of the overall composition. The dispersion is therefore not stable and settles out.

EXAMPLE 8

This example illustrates the preparation of a graft acrylic copolymer consisting by weight 95% backbone made from styrene/n-butyl acrylate/2-hydroxypropyl methacrylate (in the weight ratio of 27/40/28) and 5% macromonomer (from Example 1) made from methyl methacrylate/methacrylic acid (in the weight ratio 3/2). This graft copolymer was formed in a water dispersion using the following components:

| | Parts by Weight |
|---|---|
| Part 1 | |
| Deionized water | 24.85 |
| Macro Example 1 | 4.5 |
| Dimethylethanolamine | 0.9 |
| Part 2A (monomer solution) | |
| Styrene | 12.15 |
| n-Butyl acrylate | 18.0 |
| Hydroxypropyl methacrylate | 12.60 |

-continued

| Part 2B (azo solution) | |
|---|---|
| Acid-Azo (4,4'-azobis-(4-cyano pentanecarboxylic acid) | 2.0 |
| Dimethylethanolamine | 1.2 |
| Deionized water | 18.8 |
| Part 3 | |
| Deionized water | 2.0 |
| Part 4 | |
| t-Butylperpivalate | 0.1 |
| Methyl ethyl ketone | 0.7 |
| Part 5 | |
| n-Butanol | 0.2 |
| Part 6 | |
| Deionized water | 2.0 |
| | 100.0 |

Part 1 was heated to 95° C., plus or minus 2 degrees, and adjusted to a pH of 7.5–7.8. Part 2A (monomers) and 2B (azo solution) were added simultaneously over 4 hours at 95° C., ±2° C. Part 3 (deionized water) was used for rinsing and the mixture was held for 30 min at reflux. Part 4 was then added over 60 min and the reactor inlet rinsed with Part 5. The mixture was then again held at 95±2° C. for 30 min. and finally rinsed with Part 6 (water). The reaction product was characterized as follows:

| Solids (percent) = | 50.5 |
|---|---|
| Viscosity = | 500 cps |
| pH = | 8.1 |
| MN = | 39000 |
| MW = | 117200 |

EXAMPLE 9

This example illustrates the preparation of a graft acrylic copolymer consisting by weight 90% backbone made from styrene/n-butyl acrylate/2-hydroxypropyl methacrylate (in the weight ratio of 47/38/25) and 10% macromonomer (from Example 2) made from methyl methacrylate/hydroxyethyl methacrylate or EHMA/methacrylic acid (in the weight ratio 5.2/2.8/2). This graft copolymer was formed in a water dispersion using the following components:

| Part 1 | |
|---|---|
| Deionized water | 23.85 |
| Macro Example 2 | 9.0 |
| Dimethylethanolamine | 0.9 |
| Part 2A (monomer solution) | |
| Styrene | 12.15 |
| n-Butyl acrylate | 17.10 |
| Hydroxypropyl methacrylate | 11.25 |
| Part 2B (azo solution) | |
| Acid-Azo | 2.0 |
| Dimethylethanolamine | 1.2 |
| Deionized water | 17.8 |
| Part 3 | |
| Deionized water | 2.0 |
| Part 4 | |
| t-Butylperpivalate | 0.1 |

-continued

| Methylethyl ketone | 0.7 |
|---|---|
| Part 5 | |
| n-Butylglycolether | 0.2 |
| Part 6 | |
| Deionized water | 2.0 |
| | 100.0 |

Part 1 was heated to 95° C., plus or minus 2 degrees, and adjusted to a pH of 7.5–7.8. Part 2A (monomers) and 2B (azo solution) were added simultaneously over 4 hours at 95° C., ±2° C. Part 3 (deionized water) was used for rinsing and the mixture was held for 30 min at reflux. Part 4 was then added over 60 min and the reactor inlet rinsed with Part 5. The mixture was then again held at 95±2° C. for 30 min. and finally rinsed with Part 6 (water). The reaction product was characterized as follows:

| Solids = | 47.7 |
|---|---|
| Visc = | 1500 cps |
| pH = | 8.5 |
| MN = | 20500 |
| MW = | 79400 |

EXAMPLE 10

This example illustrates the preparation of a graft acrylic copolymer consisting by weight of 90% backbone made from styrene/n-butyl acrylate/2-hydroxypropyl methacrylate (in the weight ration of 22/40/28) and 10% macromonomer (from Example 1) made of methyl methacrylate/methacrylic acid (in the weight ratio of 6/4). This graft copolymer was formed in a water dispersion using the following components:

| | Parts by Weight |
|---|---|
| Part 1 | |
| Deionized water | 22.60 |
| Macro Example 1 | 9.0 |
| Dimethylethanolamine | 1.8 |
| Part 2A | |
| Styrene | 9.9 |
| n-Butyl acrylate | 18.0 |
| 2-Hydroxypropyl methacrylate | 12.6 |
| Part 2B | |
| Acid-Azo | 2.0 |
| Dimethylethanolamine | 1.2 |
| Deionized water | 17.9 |
| Part 3 | |
| Deionized water | 2 |
| Part 4 | |
| t-Butylperpivalate | 0.1 |
| n-Butylglycolether | 0.7 |
| Part 5 | |
| n-Butylglycolether | 0.2 |
| Part 6 | |
| Deionized water | 2.0 |
| | 100.0 |

Part 1 was heated to reflux at 95±2° C. and the pH adjusted to 7.5–7.8. Part 2A (monomers) and Part 2B (azo solution)

was added simultaneously over 4 hours at 95° C.±2 C. Then the inlet was rinsed with Part 3 (deionized water) and the mixture held at reflux for 30 min. Part 4 was added over 60 min. and rinsed with part 5 solvent. Finally, deionized water (Part 6) was added. The reaction product was characterized as follows:

| Solids | 49.9 |
|---|---|
| Visc | 1500 cps |
| pH | 8.2 |
| MN | 22900 |
| MW | 78400 |

EXAMPLE 11

This example illustrates the preparation of a graft acrylic copolymer consisting by weight of 80% backbone made from styrene/n-butyl acrylate/2-hydroxypropyl methacrylate (in the weight ration of 22/136/22) and 20% macromonomer (from Example 2) made of methyl methacrylate/hydroxyethyl methacrylate/methacrylic acid (in the weight ratio of 10.4/5.6/4). This graft copolymer was formed in a water dispersion using the following components:

| | Parts by Weight |
|---|---|
| Part 1 | |
| Deionized water | 18.10 |
| Macro Example 2 | 18.0 |
| Dimethylethanolamine | 1.8 |
| Part 2A | |
| Styrene | 9.9 |
| n-Butyl acrylate | 16.2 |
| 2-Hydroxypropyl methacrylate | 9.9 |
| Part 2B | |
| Acid-Azo | 2.0 |
| Dimethylethanolamine | 1.2 |
| Deionized water | 17.9 |
| Part 3 | |
| Deionized water | 2.0 |
| Part 4 | |
| t-Butylperpivalate | 0.1 |
| n-Butylglycolether | 0.7 |
| Part 5 | |
| n-Butylglycolether | 0.2 |
| Part 6 | |
| Deionized water | 2.0 |
| | 100.0 |

Part 1 was heated to reflux at 95±2° C. and the pH adjusted to 7.5–7.8. Part 2A (monomers) and Part 2B (azo solution) was added simultaneously over 4 hours at 95° C.±2 C. Then the inlet was rinsed with Part 3 (deionized water) and the mixture held at reflux for 30 min. Part 4 was added over 60 min. and rinsed with part 5 solvent. Finally, deionized water (Part 6) was added. The reaction product was characterized as follows:

| Solids | 52.1 percent |
|---|---|
| Visc | 18000 cps |

-continued

| pH | 8.1 |
|---|---|
| MN | 18700 |
| MW | 52500 |

EXAMPLE 12

This example illustrates another graft copolymer comprising 92.5% backbone made from styrene/n-butyl acrylate/2-hydroxybutyl acrylate (in the weight ratio of 35/30/27.5) and 7% macromonomer (from Example 1) made from methyl methacrylate/methacrylic acid (in the weight ration of 4.5/3). The graft copolymer was formed in a water dispersion of the macromonomer. The graft copolymer was prepared in a glass reactor using the following components:

| | Parts by Weight |
|---|---|
| Part 1 | |
| Deionized water | 24.30 |
| Macro of Example 1 | 6.75 |
| Dimethylethanolamine | 1.32 |
| Part 2A | |
| Styrene | 15.75 |
| n-Butyl acrylate | 13.50 |
| 2-Hydroxybutyl acrylate | 12.38 |
| Part 2B | |
| Acid-AZO | 1.0 |
| Dimethylethanolamine | 0.65 |
| Deionized water | 20.05 |
| Part 3 | |
| Deionized water | 2.0 |
| Part 4 | |
| Deionized water | 2.3 |
| | 100.0 |

The pH of Part 1 was adjusted to 7.5–7.8 and the mixture was heated to reflux at 90° C. Part 2A (including monomers) and Part 2B (azo solution) was added simultaneously over 4 hours at 90° C. Part 3 was used for rinsing and then the reactor contents were held at reflux for 60 min, followed by pH adjustment to 8.0. Deionized water (Part 4was added The reaction product was characterized as follows:

| Solids | 52.5 percent |
|---|---|
| Visc | 1050 cps |
| pH | 8 |
| MN | 25900 |
| MW | 112900 |

Comparative Example 13

As a comparison for Example 13, a copolymer was prepared in one step, using no macromonomer, from a monomer mixture comprising styrene/methyl methacrylate/n-butyl acrylate/2-hydroxybutyl acrylate/methacrylic acid (in the weight ratio of 35/4.5/30/27.5/3). The dispersion was not stable.

EXAMPLE 14

The same procedure as in example 12 was used except that the monomers in the backbone were changed to styrene (16.875 parts), butyl acrylate (13.50 parts) and hydroxypropyl acrylate (11.25 parts) in the weight ratio of 37.5/30/25. The resulting graft copolymer was characterized as follows:

| Solids | 51.1 percent |
|---|---|
| Visc | 490 cps |
| pH | 8.1 |
| MN | 12000 |
| MW | 122400 |
| Particle Size (Bimodal) | 109 nm (92%) and 195 nm (8%) |

EXAMPLE 15

This example illustrates the preparation of a graft copolymer comprising 92.5% backbone made from styrene/n-butyl acrylate/2-hydroxypropyl methacrylate (in the weight ratio of 25/40/27.5) and 7.5% macromonomer (from Example 1) made from methyl methacrylate/methacrylic acid (in the weight ratio of 4.5/3). In this example, the azo solution used in the above Example 13 was replaced with 0.2 parts ammoniumpersulfate (AP) in 21.5 parts in deionized water. The resulting stable graft polymer was characterized as follows:

| Solids | 48.4% |
|---|---|
| Viscosity | 77 cps |
| pH | 8 |
| MN | 7200 |
| MW | 132.600 |
| Particle Size | 210 nm |

EXAMPLE 16

This example illustrates a graft copolymer according to the present invention comprising 94% backbone made from styrene/methyl methacrylate/n-butyl acrylate/methacrylamide/2-hydroxyethyl acrylate (in the weight ratio of 27/14.5/46/4/2.5) and 6% macromonomer (from Example 1) made from methyl methacrylate/methacrylic acid (in the weight ratio of 3.6/2.4). This graft copolymer copolymerized after dispersion in water using ammonia to form a high molecular weight binder with both hydroxy (2-hydroxyethyl acrylate) and amide (methacrylamide) functionalities. The following components were used in the preparation:

| Part 1 | |
|---|---|
| Deionized water | 31.0 |
| Macro of Example 1 | 4.8 |
| Ammonia | 0.75 |
| Part 2A (monomers) | |
| Styrene | 10.8 |
| Methyl methacrylate | 5.8 |
| n-Butyl acrylate | 18.4 |
| 2-Hydroxyethyl acrylate | 1.0 |
| Methyl ethyl ketone | 0.2 |
| Part 2B (azo-amide) | |
| Acid-azo solution | 0.2 |
| Ammonia | 0.1 |
| Deionized water | 20.35 |
| Methacrylamide | 1.6 |
| Part 3 | |
| Deionized water | 2.0 |
| Part 4 | |
| Deionized water | 8.0 |
| Acid-azo | 0.1 |
| Ammonia | 0.05 |
| Deionized water | 3.85 |
| Part 5 | |
| Deionized water | 1.0 |
| | 105.0 |

Part 1 was heated to 90° C. and the pH adjusted to from 7.0 to 7.75. Part 2A (monomers) and Part 2B (azo-amide solution) was simultaneously added over 4 hours. Part 3 (water) was used for rinsing and the mixture held at reflux for 60 min, followed by cooling and pH adjustment to 8.0 to 8.5. Part 4 was added over 60 min, followed by rinsing with water (Part 5). The product was characterized as follows:

| Solids | 36.6 percent |
|---|---|
| Viscosity | very low |
| pH | 8.4 |
| MW | too high to measure |

EXAMPLES 17–19

These example illustrate graft copolymers formed in a water dispersion of the macromonomer wherein part of the macromonomer dispersion is added simultaneously with the monomers for reaction. Each of three examples (17, 18, and 19) were prepared analogously except that the backbone monomers varied, as follows:

| Backbone Monomers of Graft Copolymer | Ex. 17 | Ex. 18 | Ex. 19 |
|---|---|---|---|
| Styrene | 25 | 37.5 | 40 |
| Butyl acrylate | 40 | 30 | 30.5 |
| Hydroxylpropylacrylate | 27.5 | | |
| Hydroxypropylacrylate | | 25 | |
| Hydroxyethylacrylate | | | 22 |

In each of the three examples, the graft copolymer comprised 92.5% backbone, composed as indicated above, and 7.5% macromonomer according to Example 1 made from methyl methacrylate and methacrylic acid in the weight ratio of 4.5 to 3.

| Part 1 | |
|---|---|
| Deionized water | 24.3 |
| Macro of Example 1 | 2.0 |
| Dimethylethanolamine | 0.39 |
| Part 2A (azo-macro solution) | |
| Macro of Example 1 | 4.75 |
| 4,4'-Azobis(4-cyanopentanoic) acid | 1.0 |
| Dimethylethanolamine | 0.93 |
| Deionized water | 21.0 |
| Part 2B | |
| Monomers (according to above ratio) | 41.625 |
| Part 3 | |
| Deionized water | 2.0 |

23
-continued

| Part 4 | |
|---|---|
| t-Butylperpivalate | 1.0 |
| Methyl ethyl ketone | 0.7 |
| Part 5 | |
| Methyl ethyl ketone | 0.2 |
| Part 6 | |
| Deionized water | 1.0 |
| | 100.0 |

Part 1 was adjusted to a pH of 7 to 7.5 and heated to 90+12° C. Part 2A (azo-macro solution) and the Part 2B (monomers) were added simultaneously over 4 hours at 90° C. Part 3 (deionized water) was used to rinse and then the reaction product was held at reflux for 30 min. Part 4 was added over 60 minute, followed by rinsing with methyl ethyl ketone (Part 5), pH adjustment to about 7.5 and the addition of some deionized water (Part 6). The reaction products were characterized as follows:

| Property | Example 17 | Example 18 | Example 19 |
|---|---|---|---|
| Solids (percent) | 50 | 49 | 50.1 |
| Viscosity (cps) | 300 | 1400 | 290 |
| pH | 7.8 | 7.4 | 7.5 |
| MN | 13600 | 15600 | not soluble |
| MW | 96000 | 161,600 | not soluble |
| Particle Size (nm) | 325 | 69 nm (45%) | 57 nm (57%) |
| | | 251 nm (55%) | 185 nm (43%) |

EXAMPLES 20–23

These examples illustrate a one component waterborne paint formulation cured by baking. The following examples were formulated at an acrylic/melamine formaldehyde ratio of 75/25 using a methylated melamine formaldehyde binder Cymel™ 325 from Cyanamid.

| Components | Ex. 20 | Ex. 21 | Ex. 22 | Ex. 23 |
|---|---|---|---|---|
| Acrylic graft | | | | |
| Copolymer Example 8 | 70 | | | |
| Copolymer Example 9 | | 70.33 | | |
| Copolymer Example 10 | | | 69.97 | |
| Copolymer Example 11 | | | | 69.03 |
| Cymel ™ 325 crosslinker | 14.7 | 17.97 | 18.33 | 19.27 |
| Byk ™ 346 (Byk Chemie) | 0.5 | 0.5 | 0.5 | 0.5 |
| Surfynol ™ 104 A surfactant (Air Products) | 0.2 | 0.2 | 0.2 | 0.2 |
| n-Butylglycolether | 3 | 3 | 3 | 4 |
| Deionized water | 11.6 | 8 | 7.7 | 6 |
| | 100 | 100 | 100 | 100 |

These clear coats were sprayed over a typical commercial waterborne basecoat at 50 microns and baked for 30 min. at 120° C. (spray viscosity of 600 mPaS). The following test results were obtained.

| Property | Ex. 20 | Ex. 21 | Ex. 22 | Ex. 23 |
|---|---|---|---|---|
| Pendulum hardness | 177 | 125 | 156 | 154 |
| Sulfuric acid resistance 10% (min.) | 6 | 4 | 7 | 6 |
| Sulfuric acid resistance 36% (min.) | 4 | 2 | 2 | 3 |
| Gloss | 91.9 | 94.7 | 94.6 | 92.9 |
| Stone chipping (1 best–5 worst) | 1 | 4 | 2 | 2 |
| Humidity | OK | OK | OK | OK |
| Xylene resistance (minutes) | 3 | <3 | 3 | 3 |

EXAMPLES 24–28

These examples illustrate a two component waterborne paint composition according to the present invention, which composition is formulated for air dry (low bake) curing. These examples were formulated using Basonat™ PLR 8878X, which is a trifunctional isocyanate commercially available from BASF and which is water dispersible. After mixing the Basonat™ PRL 8878X crosslinker at an isocyanate/hydroxyl equivalent ratio of 1/1, the viscosity (cps), hardness (Persoz) and % NCO remaining (on a film of±30 microns via IR analysis) was measured after 1 day and 14 days.

| Component | Ex. 24 | Ex. 25 | Ex. 26 | Ex. 27 | Ex. 28 |
|---|---|---|---|---|---|
| Craft Copolymer: | | | | | |
| Example 17 | 203.3 | | | | |
| Example 18 | | 203.3 | | | |
| Example 19 | | | 203.3 | | |
| Example 9 | | | | 200 | |
| Example 11 | | | | | 200 |
| Deionized water | 16.4 | 16.4 | 16.4 | 13.0 | 13.0 |
| Basonat ™ PRL 8878X | 24.05 | 24.05 | 24.05 | 24.5 | 24.5 |
| PMA | 6.25 | 6.25 | 6.25 | 12.5 | 12.5 |
| Results | | | | | |
| Viscosity 1 day | 367 | 1880 | 1392 | 1625 | gel |
| Viscosity 14 days | 186 | 1720 | 2070 | 3440 | gel |
| Hardness 1 day | 100 | 74 | 127 | 74 | 98 |
| Hardness 14 days | 141 | 113 | 152 | 119 | 140 |
| % NCO remaining | | | | | |
| 1 day | 15 | 29 | 45 | 26 | 28 |
| 14 days | 0 | 0 | 21 | 0 | 0 |

Those skilled in the art will no doubt be able to compose numerous variations on the themes disclosed, such as changing the amounts of ingredients insignificantly from those shown, adding innocuous or supplementary substances, or substituting equivalent components for those shown. Such variations are considered to be within the inventive concept, as defined in the following claims.

What is claimed is:

1. A coating composition, useful as a pigmented basecoat or a clearcoat for coating a substrate, which composition comprises:
   (a) a binder comprising:
   5 to 98 percent, based on the weight of the binder, of a graft copolymer having a weight average molecular weight of 3000 to 500,000 comprising:
   (i) 2 to 98 percent by weight of the graft copolymer of a polymeric backbone of polymerized ethylenically unsaturated monomers; and
   (ii) 98 to 2 percent, by weight of the graft copolymer, of a macromonomer attached to said polymeric backbone at a single terminal point of said macromonomer, said macromonomer having a weight average molecular weight of 500–30,000 and comprising 10 to 100 percent, by weight of the macromonomer, of polymerized alpha-beta ethylenically unsaturated monomers all having carboxylic-acid functionalities or all having amine functionalities, the macromonomer comprising methacrylate monomeric units having been reacted in the presence of a cobalt chelate chain transfer agent;

(b) 2 to 50 percent, by weight of the binder, of a crosslinking agent; and (c) 40 to 90 percent by weight, based on the weight of the composition, of an aqueous carrier comprising 80 to 100 percent water;

wherein said graft copolymer is the reaction product, in the aqueous carrier comprising 80 to 100 percent water, of said macromonomer and said ethylenically unsaturated monomers comprising said backbone, wherein at least a portion of the carboxylic-acid or amine functionalities of said macromonomer has been neutralized, and wherein the macromonomer is dissolved or dispersed in the aqueous carrier to stabilize a portion of the graft copolymer that forms an insoluble particle.

2. The composition of claim 1, wherein said macromonomer comprises between 10 and 40% by weight, based on the weight of said macromonomer, of polymerized ethylenically unsaturated monomers containing carboxylic-acid functionality.

3. The composition of claim 1, wherein said macromonomer comprises between 10 and 40% by weight, based on the weight of said macromonomer, of polymerized ethylenically unsaturated monomers containing hydroxyl functionality.

4. The composition of claim 1, wherein said backbone is predominantly polymerized acrylate or styrene, or a combination of acrylate and styrene.

5. The composition of claim 1, wherein (i) is polymerized t-butylamino ethyl methacrylate and (ii) is polymerized methacrylic acid.

6. A process for preparing a binder for a coating composition comprising a graft copolymer which has a polymeric backbone having a plurality of macromonomer arms attached thereto, the macromonomer arms having carboxylic-acid, or amine functionalities for stabilizing the graft copolymer in aqueous solution, the process comprising:

(a) preparing macromonomers in a solvent by polymerizing, using a cobalt chain transfer agent, a mixture of ethylenically unsaturated monomers comprising from 10 to 100% by weight, based on the weight of said macromonomers arms, of ethylenically unsaturated monomers all containing a carboxylic-acid functionality or all containing an amine functionality;

(b) neutralizing the macromonomers;

(c) dispersing or dissolving the neutralized macromonomers in an aqueous carrier comprising 80 to 100 percent water; and (d copolymerizing 2–98 percent by weight of said macromonomers with a blend of 98–2 percent by weight of alpha-beta unsaturated monomers such that said macromonomers are incorporated into the backbone at a single terminal point of said macromonomers, such attachment to said backbone occurring by the reaction of a terminal ethylenic unsaturation on each of said macromonomers with the monomers which polymerize to form said backbone, to thereby form the graft copolymer with a weight average molecular weight of 3000–500,000 in said aqueous carrier.

7. The composition of claim 1 wherein said polymerized ethylenically unsaturated monomers of said polymeric backbone are selected from consisting of alkyl acrylates, cycloaliphatic acrylates, aryl acrylates, styrene, alkyl styrene, and mixtures thereof.

8. The composition of claim 7 wherein said alkyl acrylates, cycloaliphatic acrylates and aryl acrylates have up to 12 carbon atoms.

9. The composition of claim 1 wherein said macromonomer is predominantly polymerized from methacrylate monomers.

10. The composition of claim 1 wherein said composition is free from a surfactant.

11. The composition of claim 1 wherein said polymeric backbone of said graft copolymer is provided with a plurality of said macromonomers attached thereto.

12. The binder made in accordance with the process of claim 6.

* * * * *

UNITED STATES PATENT AND TRADEMARK OFFICE
CERTIFICATE OF CORRECTION

PATENT NO. : 5,936,026
DATED : August 10, 1999
INVENTOR(S) : Huybrechts et al.

Page 1 of 1

It is certified that error appears in the above-identified patent and that said Letters Patent is hereby corrected as shown below:

<u>Column 26,</u>
Line 27, after "selected from" add -- the group --.

Signed and Sealed this

Twenty-first Day of August, 2001

*Attest:*

*Nicholas P. Godici*

*Attesting Officer*

NICHOLAS P. GODICI
*Acting Director of the United States Patent and Trademark Office*